United States Patent [19]

Fullton, Jr.

[11] 3,976,826

[45] Aug. 24, 1976

[54] METHOD AND APPARATUS FOR GENERATING LINE-BY-LINE PICTURE SIGNAL FROM TRANSFORMED SUBPICTURE INFORMATION

[75] Inventor: James McFerrin Fullton, Jr., Chapel Hill, N.C.

[73] Assignee: Western Electric Company, Inc., New York, N.Y.

[22] Filed: May 7, 1975

[21] Appl. No.: 575,288

[52] U.S. Cl. .............................. 178/6; 178/DIG. 3
[51] Int. Cl.² ........................................... H04N 7/12
[58] Field of Search ............ 178/DIG. 3, 6; 325/42

[56] References Cited
UNITED STATES PATENTS
3,504,112    3/1970   Gruenberg ............................ 178/6

Primary Examiner—Benedict V. Safourek
Assistant Examiner—Edward L. Coles
Attorney, Agent, or Firm—G. D. Green; D. J. Kirk

[57] ABSTRACT

Method and apparatus for generating amplitudes of picture points in a line-by-line picture signal for a display device from subpicture information encoded as coefficients of a Hadamard transform. Amplitudes of the picture points in a line are determined by generating selected elements of a basis vector associated with each coefficient in a Hadamard matrix and, for each element, forming a product of the coefficient and a factor determined according to the value of the element. Each element and the product determined therefrom relate to a picture point. All the products for each picture point are added to give the amplitude for that point.

12 Claims, 4 Drawing Figures

METHOD AND APPARATUS FOR GENERATING LINE-BY-LINE PICTURE SIGNAL FROM TRANSFORMED SUBPICTURE INFORMATION

BACKGROUND OF THE INVENTION

1. Field of the Invention

This invention relates to picture regeneration, and more particularly, to line-by-line picture regeneration from transformed subpicture information.

2. Discussion of the Prior Art

Various techniques have been proposed for reducing the amount of information necessary to define a picture, particularly for use in transmission systems for television or facsimile. For example, it has been found that when information defining elements of a picture is transformed using a Hadamard transform or a Fourier transform into a series of coefficients, a useable picture can be regenerated from selected ones of the coefficients. Since the selected coefficients comprise less data than the original picture information, storage and communications channel bandwidth requirements are reduced. Additionally, when noise in the communications channel affects picture information transmitted as Hadamard or Fourier coefficients, the picture reconstructed from the coefficients is typically more acceptable than a picture reconstructed from noisy untransformed picture information. A more complete description of transforming picture information is given in an article entitled, "Computer Picture Processing" by H. J. Landau and D. Slepian in the May-June 1971 issue of *The Bell System Technical Journal*.

As is pointed out in the above-mentioned article, a typical method of transforming a picture comprises encoding the picture as a matrix of digitally encoded picture points, dividing the picture into a coarse matrix of subpictures, transforming the amplitudes of the picture points of each subpicture with a Hadamard transform, and selecting certain coefficients resulting from the transformation to represent the picture. The Hadamard transform is preferred for this purpose because it is simpler to implement than Fourier or other transforms.

In applying the Hadamard transform, choices must be made among various decision methods for selecting the coefficients, the weighting factors for balancing the coefficients, and the quantizing methods used to encode the original picture. These choices may influence the quality of the picture reconstructed from the transformed picture information; however, their selection is beyond the scope of this discussion, and not necessary to an understanding of the invention to be described.

Algorithms for Hadamard transformations are well known; for example, a description of such an algorithm appears in the article entitled, "Hadamard Transform Image Coding," by Pratt et al. that appears on page 58 of the January 1969 issue of the *Proceedings of the IEEE*. The algorithm can be implemented by a general-purpose digital computer or by logic circuitry designed for the purpose as is well known in the art. Logic circuitry would be preferred for a television system because high-speed operation is necessary.

Given that the subpictures comprising a picture have been encoded as selected Hadamard transform coefficients, how is the original picture to be reconstructed? Obviously, one would consider taking the inverse transform of the coefficients to reconstruct the picture points for each subpicture, and then reassembling the subpictures to form a representation of the original picture. However, it is not always convenient to display a picture as a series of subpictures. For example, facsimile receivers and television displays typically reconstruct a picture as a raster of variable intensity lines. The problem exists, then, of converting picture information encoded as Hadamard transform coefficients of subpictures into line-by-line picture information for reconstructing a representation of the original picture.

A solution that might occur to one familiar with the art would be to reconstruct the amplitudes of the picture points for each subpicture from the encoded information, store the resulting amplitudes of the reconstructed picture points in a memory, and then sequentially retrieve the amplitudes for the picture points in each line. However, such a solution would require a memory large enough to store the amplitudes of all the picture points in a row of subpictures, and would require passage of picture information through elements of two logic systems: a first logic system to reconstruct the picture-point amplitudes for each subpicture, and a second logic system to read the stored amplitudes from the memory and rearrange the amplitudes in the proper sequence to generate the line-by-line signal. A solution requiring fewer logic elements and less memory is desired.

SUMMARY OF THE INVENTION

The invention contemplates methods for converting encoded subpicture information into a line-by-line signal for displaying a row of the subpictures. The encoded information for all the subpictures in the row is stored. Then, for each line of the line-by-line signal, the information for each subpicture is retrieved and decoded to generate the portion of the line falling within that subpicture. More particularly, methods are disclosed for decoding subpicture information encoded using Hadamard transforms.

Apparatus is also disclosed for performing the above-described methods.

These and other aspects of the invention will become apparent from consideration of the drawings and the following description.

DESCRIPTION OF THE DRAWINGS

FIG. 3 is a diagram of a Hadamard matrix; and

DETAILED DESCRIPTION OF THE INVENTION

Figure 1:
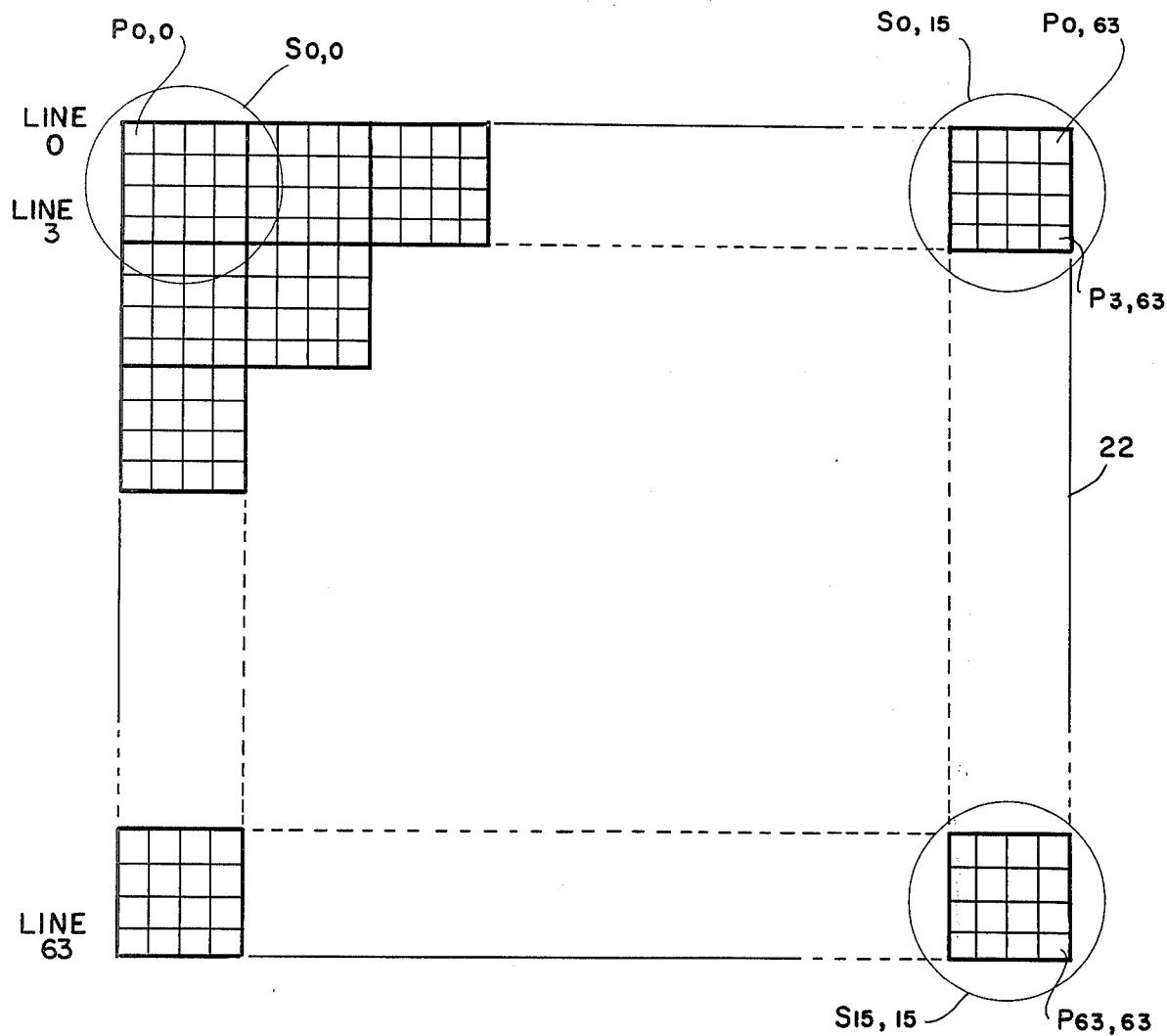
FIG. 1 is a representation of an exemplary matrix of picture points divided into subpictures.

An exemplary picture format represented by picture points grouped in subpictures is shown in FIG. 1. There, a picture 22 is shown comprising a 64 × 64 matrix of picture points $P_{0,0}$ to $P_{63,63}$. Superimposed on this matrix is a 16 × 16 matrix of subpictures $S_{0,0}$ to $S_{15,15}$. This exemplary picture is square and fairly coarse, having only 64 lines of picture information and 64 picture points in each line; in comparison, a frame in an ordinary broadcast television picture comprises 525 lines of picture information. However, this example will suffice to describe how a picture is decoded by the method and apparatus of the invention. It will be clear to those skilled in the art that the principles of the invention are applicable to pictures having other formats.

Figure 2:
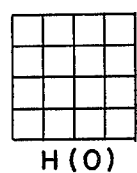
FIG. 2 is a diagram of Hadamard basis vectors for the subpictures of FIG. 2.
Figure 2:
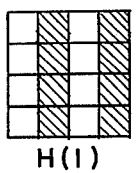
Figure 2:
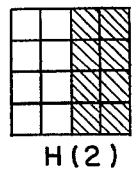
Figure 2:
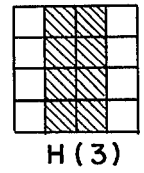
Figure 2:
Figure 2:
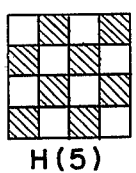
Figure 2:
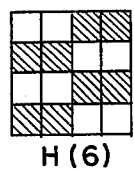
Figure 2:
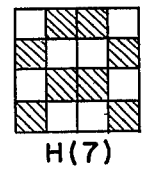
Figure 2:
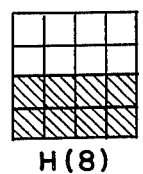
Figure 2:
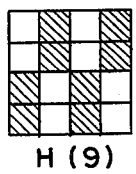
Figure 2:
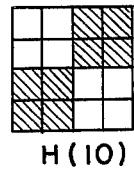
Figure 2:
Figure 2:
Figure 2:
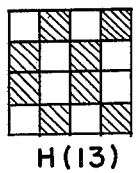
Figure 2:
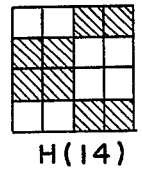
Figure 2:
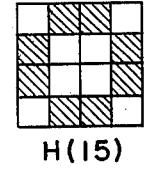

As noted above, when a picture is encoded by Hadamard transformations, the result is a series of coefficients from which certain coefficients can be selected for transmission. Each coefficient is associated with a particular Hadamard basis vector. The 16 possible basis vectors for a 4 × 4 subpicture are diagrammed in FIG. 2. Each element of each basis vector is shown shaded or unshaded to aid in a conceptual understanding of how the coefficients are derived. The shaded elements are shown to have a value −1, and the unshaded elements +1, which are values useful for explanation.

If each basis vector is thought of as a mask, with the shaded areas opaque and the unshaded areas transparent, the coefficient associated with each basis vecor can then be thought of as the amplitude (brightness) of the subpicture when viewed through the mask. Thus, the coefficient of basis vector $H(0)$ is the amplitude of the entire picture, the coefficient of basis vector $H(2)$ is the amplitude of the left half of the subpicture, and so on. Taking this view of the basis vectors, the unshaded elements have a value 1 and the shaded elements 0. However, +1 and −1 are more typical of values that would be used in a Hadamard processor to calculate the coefficients. Other typical values are +¼ and −¼ as noted by Landau et al. Changing these values merely changes the magnitude and zero reference point of the coefficients.

If the basis vector element values +1 and −1 are used for calculating the coefficients, the amplitudes of the picture points can be reconstructed by assigning these values to the elements and then, for each picture point, calculating the product of the element related to that picture point from each basis vector and the coefficient for that basis vector, and summing the products. From this it can be seen that coefficients having relatively low magnitudes will contribute only slightly to the final summed value. On this basis, low magnitude coefficients can be discarded to reduce the amount of information needed to define a subpicture.

Figure 3:
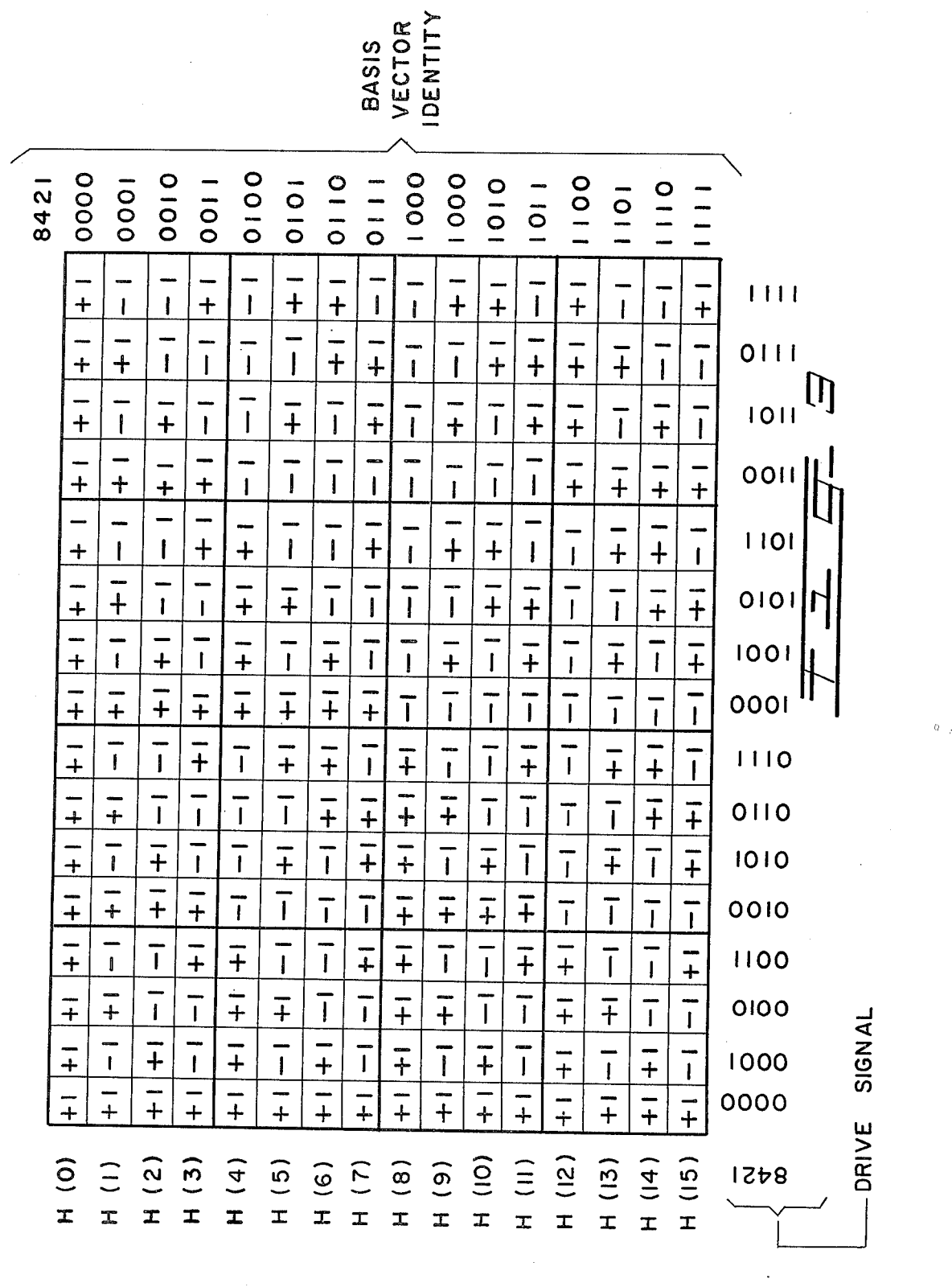

The elements of the basis vectors can be rearranged into rows and grouped in an array to form a Hadamard matrix, as shown in FIG. 3. FIG. 3 shows an order-4 Hadamard matrix wherein the element values +1 and −1 are used. Note that the elements in each row of the matrix correspond to the elements of the like-labeled basis vector shown in FIG. 2 when read row-by-row from top to bottom and from left to right. The drive signal notation under each column in the matrix identifies that column, and will be useful later in describing apparatus for generating basis vectors.

The rows (basis vectors) in a Hadamard array are also known as Walsh functions, and the basis vector numbers are analogous to Walsh-function numbers. The relationships among Hadamard arrays and Walsh functions are more fully discussed in U.S. Pat. No. 3,795,864 issued to me on Mar. 5, 1974 and assigned to the assignee of this invention.

As indicated above, coefficients can be selected in various ways; one method is to select the M largest coefficients, for example, the four largest coefficients. The basis vectors relating to the selected coefficients must be identified so that the subpicture can be properly reconstructed; however, systems are possible, and contemplated by this invention, in which coefficients relating to certain basis vectors are always chosen, and others always rejected. Another possibility is a combination of the above selection methods, that is, certain coefficients are always chosen, and then the M largest of the remaining coefficients are selected. For example, the highest order coefficient relating to basis vector $H(0)$, which gives the amplitude of the overall subpicture, might always be selected, then the four largest remaining coefficients might be chosen. As noted above, the selection method used can affect the quality of a picture reconstructed from the selected coefficients.

Terms comprising the coefficients and, if necessary, their basis-vector identities for each subpicture can be packed into a single digital word for storage or transmission. For example, a 12-bit term can comprise four bits to identify the basis vector, and eight bits to express the magnitude of the coefficient, one of the eight bits being a sign bit. If, for example, the four largest coefficients are selected, the data for each subpicture would then comprise four such 12-bit terms in a 48-bit word.

Figure 4:
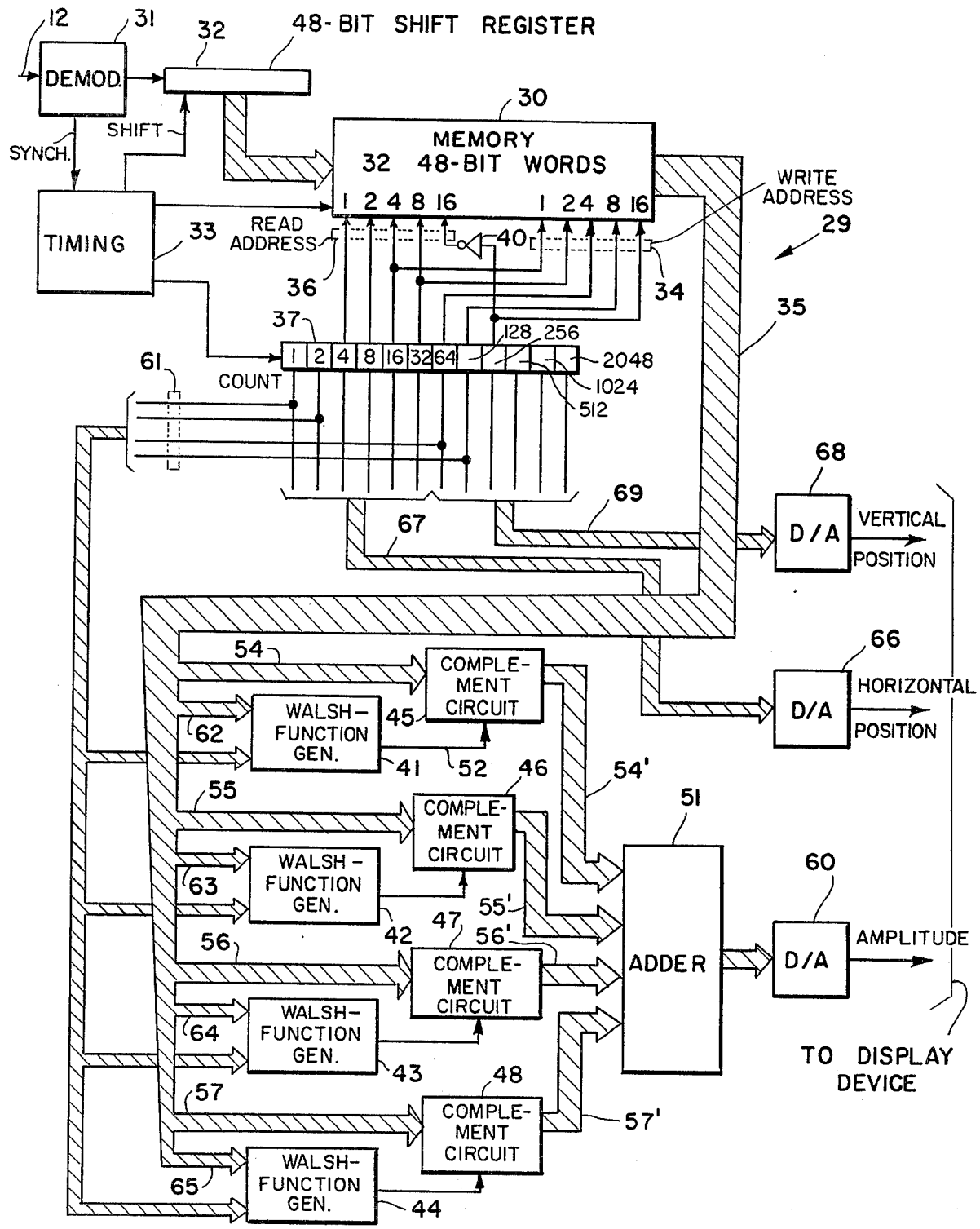
FIG. 4 is a detailed schematic block diagram of apparatus according to the invention for regenerating an encoded picture.

FIG. 4 is a schematic block diagram of exemplary apparatus, according to the invention, for accepting picture information encoded as described above. For purposes of illustration, the picture format shown in FIG. 1 is assumed, and each subpicture is taken to be encoded as a 48-bit word comprising four 12-bit terms; each term having 4 bits identifying a basis vector, and eight bits indicating the sign and magnitude of the coefficient for that basis vector.

Memory 30 in decoder 29 stores received terms for two rows of subpictures in 32 48-bit words. Memory 30 is loaded with these words from communications channel 12 via demodulator 31 and shift register 32, which serves to convert information for each subpicture from serial form into a 48-bit word. Timing circuit 33 generates timing signals for the circuit elements in FIG. 4 and synchronizes these signals by well known methods with the signal received by demodulator 31 from communications channel 12.

A 48-bit word is written into memory 30 from shift register 32 according to a write address on leads 34. Similarly, a 48-bit word is read from memory 30 onto multi-lead data path 35 according to a read address on leads 36.

Both the read and write addresses are derived from counter 37, which is a binary counter driven by pulses from timing circuit 33. The 1-, 2-, 4-, 8-, and 16-weight bits of the write address are derived respectively from the 16-, 32-, 64-, 128-, and 256-weight stages of counter 37. Similarly, the 1-, 2-, 4-, and 8-weight bits of the read address are derived respectively from the 4-, 8-, 16-, and 32-, weight stages of counter 37. The 16-weight bit of the read address is derived through inverter 40 from the 256-weight stage of counter 37. Thus, the 16-weight bits of both the read and write addresses are derived from the same source, but are inverted with respect to each other, so that words representing one row of subpictures are read from shift register 32 into one half of memory 30 while words representing another row of subpictures are being read out of the other half of memory 30 onto data path 35.

Data path 35, which is 48 bits wide, branches into 8-bit paths 54, 55, 56, and 57 and respective 4-bit paths 62, 63, 64, and 65. The 8-bit paths carry the signs and magnitudes of the four coefficients in the word, and the 4-bit paths carry the identity of each basis vector to Walsh-function generators 41, 42, 43, and 44.

As is well known, a Walsh-function generator can be used to generate the basis vectors comprising a Hadamard array, such as is shown in FIG. 3. Walsh function generators 41, 42, 43, and 44 can be either combinational logic circuits, for example, as disclosed in U.S. Pat. No. 3,795,864 noted above, or read-only memories programmed to give the appropriate output for each possible input combination. The +1 and −1 values for the elements of the array shown in FIG. 3 correspond respectively to the logical 0 and logical 1 that are generated by the logic circuits or memory comprising Walsh-function generators 41, 42, 43 and 44. The Hadamard array shown in FIG. 3 diagrams the output of a Walsh-function generator driven by the basis-vector identities and the drive signals indicated respectively along the right and bottom sides of the array. Thus, if the basis-vector identity is 0110, indicating basis vector H(6) and the drive signal is 0100, the output of a Walsh-function generator receiving those signals will be logical 1, corresponding to −1 in the Hadamard array shown in FIG. 3. A complete basis vector is generated when the basis-vector identity is held constant and the drive signal is cycled through all its multiple states.

Complement circuit 45 serves as a means to multiply the coefficient on path 54 associated with Walsh-function generator 41 by either a first factor +1 or a second factor −1, according to the output of generator 41. The output of complement circuit 45 on path 54' is identical to its input when the output on lead 52 of Walsh-function generator 41 is 0, indicating the basis-vector element +1, and the complement of its input when the output of Walsh-function generator 41 is 1, indicating the basis-vector element −1. Complement circuit 45 can be a one's complement circuit, which forms the one's complement by merely inverting the bits of the coefficient on path 54 when the signal on line 52 is 1. Alternatively, complement circuit 45 can be a two's complement circuit, which forms the two's complement by inverting the bits of the coefficient on path 54, adding 1 to the least significant bit, and propagating any resulting carries through to the higher order bits. Such complement circuits are well known in the art. The two's complement of a binary number represents the negative of that number, whereas the one's complement represents the negative with a 1-unit error. Where such an error can be tolerated, the simpler one's complement circuit is usually preferred. Complement circuits 46, 47, and 48 are similar to circuit 41. Clearly, complement circuits 45, 46, 47 and 48 could be replaced with more complex multiplying circuits if it were desired to multiply by positive and negative factors other than +1 and −1. Such multiplying circuits are well known to those skilled in the art.

The four basis-vector coefficients as modified by complement circuits 45, 46, 47 and 48 are directed into adder 51 via data paths 54', 55', 56' and 57'. Adder 51 is a conventional binary adder well known in the art. The output of the adder can be connected to digital-to-analog (D/A) converter 60, also well known in the art, which converts the output of adder 51 to an analog amplitude signal for an external display device (not shown). However, if the external display device can utilize digital information, D/A converter 60 is not necessary.

The four Walsh-function generators 41, 42, 43, and 44 each receive drive signals in parallel via leads 61 from the 1-, 2-, 64- and 128-weight stages of counter 37, and, as noted above, basis-vector identities, via paths 62, 63, 64, and 65. The drive signals from the 1- and 2-weight stages of counter 37 drive Walsh-function generators 41, 42, 43, and 44 to generate four elements of the basis vectors indicated on paths 62, 63, 64, and 65; the particular four elements are selected by the drive signals from the 64- and 128-weight stages of counter 37. D/A converters 66 and 67 are connected to selected stages of counter 37 via paths 68 and 69 to generate vertical and horizontal position signals for the external display device. Again, if the external display device can utilize digital information, D/A converters 66 and 67 are not necessary.

In operation, counter 37 is driven by pulses from timing circuit 33 at the rate that picture points are to be displayed on the display device. Stages 1 and 2 of counter 37 supply the 1- and 2-weight bits forming the drive signal on leads 61 for Walsh-function generators 41, 42, 43, and 44. The next four stages of counter 37 supply the 1-, 2-, 4-, and 8-weight bits of the read address for memory 30. The next two stages of counter 37, the 64- and 128-weight stages, supply the 4- and 8-weight bits forming the drive signal for Walsh-function generators 41, 42, 43, and 44. The six lower order stages of counter 37 drive D/A converter 66 via path 67 to generate the horizontal position signal for the external display device, and the six higher order stages of counter 37 drive D/A converter 68 via path 69 to generate the vertical position signal for the external display device. As counter 37 is cycled by pulses from timing circuit 33, D/A converter 66 generates 64 horizontal staircase cycles for the 64 horizontal lines of picture elements, and D/A converter 68 generates one staircase cycle to vertically position the lines in the picture in a manner well known in the art.

As counter 37 is cycled, a particular setting is held on the 4- and 8-weight bits of the drive signal to the Walsh-function generators while 16 words defining 16 subpictures are successively applied to the generators, exclusive-OR gates, and adder 51 via data path 35 and its branches; and for each word, the 1- and 2-weight bits of the drive signal to the Walsh-function generators are cycled through their four combinations. The 64- and 128-weight stages of counter 37 supply the lowest order bits for vertical position D/A converter 68. Thus, for each combination of these two bits, a line of picture points is generated. Each word stored in memory 30 is read four times, once for each line in the subpicture defined by the word.

Note that what is stored in memory 30 is compressed picture information comprising basis-vector identities and coefficients and that these terms are advantageously decoded as the amplitudes of the actual picture points are generated. Thus, there is no need to store the amplitudes themselves, and memory 30 is much smaller than would be required for such storage. Note also that the compressed information is processed in parallel by the Walsh-function generators, their associated exclusive-OR gates, and adder 51. Using modern logic devices, the speed of such generators, gates, and adders is such that frames for a television display can easily be handled in real time.

As was noted earlier, various methods can be used to select the coefficients to be retained for a subpicture. If the same coefficients are always selected, what is needed in decoder 29 is a Walsh-function generator to generate the basis vector relating to each coefficient, multiplying means for each coefficient, and an adder 51 that can accept the same number of inputs as there are Walsh-function generators. Clearly, memory 30 must then accommodate the coefficients, but not the identities of the basis vectors. The Walsh-function generators could each be equipped with means for supplying a constant defining the particular basis vector to be generated, but, preferably, each Walsh-function generator for such an embodiment would be designed to generate only its particular basis vector. Such a design would be readily apparent to those skilled in the art.

Since the various basis-vector coefficients can also be given different weights, if desired, appropriate weighting circuits may be used in the input circuits to adder 51 to properly weight the coefficients. Similarly, D/A converter 60 can be linear or non-linear, according to how the original picture was quantized. Many ways of implementing weighting circuits and linear and non-linear D/A converters will be apparent to those skilled in the art.

One skilled in the art may make changes and modifications to the embodiments of the invention disclosed herein, and may devise other embodiments, without departing from the spirit and scope of the invention.

What is claimed is:

1. A method of automatically converting encoded subpicture information into a line-by-line signal for displaying a row of a plurality of the subpictures, comprising:
   storing the encoded subpicture information for all the subpictures in the row;
   for each line of the line-by-line signal, sequentially retrieving the stored information for each subpicture; and
   decoding the retrieved information for each subpicture to generate the portion of the line falling within that subpicture.

2. In a display system wherein a picture is divided into rows having subpictures therein and the amplitudes of picture points in each subpicture are encoded as at least one coefficient of a Hadamard transform, each coefficient being associated with a particular basis vector in a Hadamard matrix, a method of automatically generating amplitudes for at least one line of picture points encompassing all the subpictures in a row, comprising:
   A. storing the coefficients of the subpictures in the row; and
   B. for each line of picture points;
      a. selecting the elements of each basis vector that relate to the picture points in that line;
      b. for each subpicture in the row:
         i. retrieving the stored coefficients;
         ii. generating the elements of the basis vectors selected in step (a);
         iii. for each basis-vector element generated in step (ii), forming the product of the coefficient associated with the basis vector and either a first factor or a second factor according to the value of the element; and
         iv. for each picture point, adding the products formed in step (iii) for the basis-vector elements relating to the picture point to form the amplitude of the picture point.

3. In a display system wherein a picture is divided into rows having subpictures therein and the amplitudes of picture points in each subpicture are encoded as at least one term having as a portion a coefficient of a Hadamard transform, and as another portion a number identifying a basis vector in a Hadamard matrix associated with the coefficient; a method of automatically generating amplitudes for at least one line of picture points encompassing all the subpictures in a row, comprising:
   A. Storing the terms of the subpictures in the row; and
   B. for each line of picture points:
      a. selecting the elements of each basis vector that relate to the picture points in that line;
      b. for each subpicture in the row:
         i. retrieving the stored terms;
         ii. generating the elements selected in step (a) of the basis vectors identified in the terms retrieved in step (i);
         iii. for each basis vector element generated in step (ii) forming the product of the coefficient in the term identifying the basis vector and either a first factor or a second factor according to the value of the element; and
         iv. for each picture point, adding the products formed in step (iii) for the basis vector elements relating to the picture point to form the amplitude of the picture point.

4. Apparatus for converting encoded subpicture information into a line-by-line signal for displaying a row of a plurality of the subpictures, which comprises:
   means for storing the encoded subpicture information for all the subpictures in the row, and
   means for generating each line by sequentially retrieving the stored information for each subpicture and decoding the retrieved information to generate the portion of the line falling within the subpicture.

5. In a display system wherein a picture is divided into rows having subpictures therein and the amplitudes of picture points in each subpicture are encoded as at least one coefficient of a Hadamard transform, each coefficient being associated with a particular basis vector in a Hadamard matrix, apparatus for generating amplitudes for at least one line of picture points encompassing all the subpictures in a row, which comprises:
   a memory for storing the coefficients of each subpicture in the row;
   a number of Walsh-function generators equal to the number of coefficients defining each subpicture for generating the particular basis vectors associated with the coefficients, each generator accepting a signal that selects elements of its particular basis vector, each generator responding to a multiple-state drive signal to generate one of the selected elements for each drive-signal state;
   multiplying means associated with each generator for forming the product of the coefficient associated with the basis vector of the generator and either a first factor or a second factor in response to each element generated by the generator;
   means for generating the select signal according to the position of the current line in the row of subpictures and for supplying the select signal to the generators;
   means for reading the coefficients from memory for each subpicture in turn, and for applying the coefficients to the multiplying means;
   means for generating the drive signal and for applying the drive signal to the generators; and
   means for adding the products from the multiplying means during each state of the drive to form the amplitude of one of the picture points.

6. Apparatus according to claim 5 wherein the coefficient and products are each represented as a sign bit and magnitude bits, the first and second factors are +1 and −1, respectively, and each multiplying means comprises:

an exclusive-OR gate, connected to perform the exclusive-OR function between the sign bit of the associated coefficient and the output of the associated Walsh-function generator, for generating the sign bit of the product; and means for connecting the magnitude bits of the coefficient to be the magnitude bits of the product.

7. Apparatus according to claim 5 wherein at least one Walsh-function generator is a combinational logic circuit.

8. Apparatus according to claim 5 wherein at least one Walsh-function generator is a read-only memory.

9. In a display system wherein a picture is divided into rows having subpictures therein and the amplitudes of picture points in each subpicture are encoded as at least one term having as a portion a coefficient of a Hadamard transform and as another portion a number identifying a basis vector in a Hadamard matrix associated with the coefficient; apparatus for generating amplitudes for at least one line of picture elements encompassing all the subpictures in a row, which comprises:

a memory for storing the coefficients of each subpicture in the row;

a number of Walsh-function generators equal to the number of terms defining each subpicture, each generator accepting a number that identifies a particular basis vector and a signal that selects elements of the identified basis vector, each generator responding to a multiple-state drive signal to generate one of the selected elements of the identified basis vector for each drive-signal state;

multiplying means associated with each generator for forming the product of the coefficient from the term associated with the generator and either a first factor or a second factor in response to each element generated by the generator;

means for generating the select signal according to the position of the current line in the row of subpictures and for supplying the select signal to the generators;

means for reading the terms from memory for each subpicture in turn, for applying the basis vector number in each term to the associated Walsh-function generator, and for applying the coefficient in each term to the associated multiplying means;

means for generating the drive signal and for applying the drive signal to the generators; and means for adding, during each state of the drive signal, the products from the multiplying means to form the amplitude of one of the picture points.

10. Apparatus according to claim 9 wherein the coefficient and products are each represented as a sign bit and magnitude bits, the first and second factors are +1 and −1, respectively, and each multiplying means comprises:

an exclusive-OR gate, connected to perform the exclusive-OR function between the sign bit of the associated coefficient and the output of the associated Walsh-function generator, for generating the sign bit of the product; and means for connecting the magnitude bits of the coefficient to be the magnitude bits of the product.

11. Apparatus according to claim 9 wherein at least one Walsh-function generator is a combinational logic circuit.

12. Apparatus according to claim 9 wherein at least one Walsh-function generator is a read-only memory.

* * * * *